Figure 1:
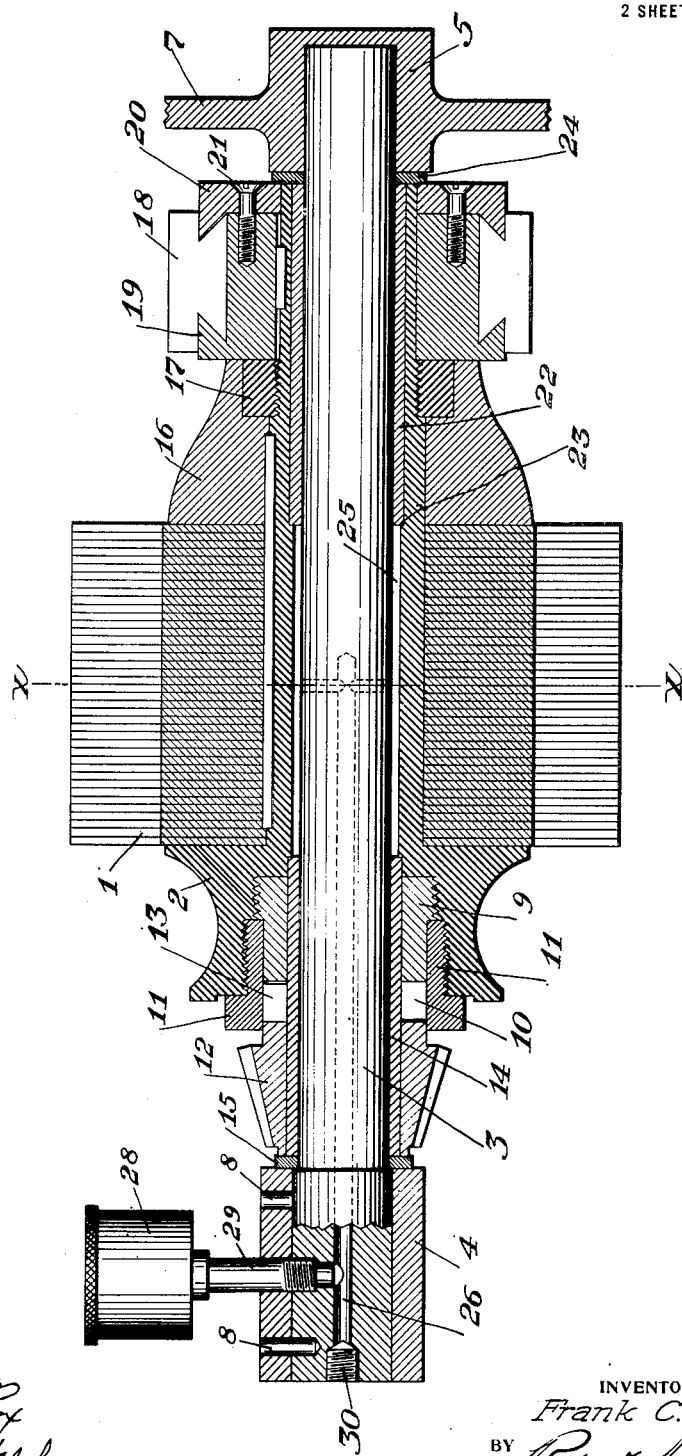

F. C. SINBACK.
ELECTRIC MACHINE.
APPLICATION FILED MAY 14, 1914.

1,189,180.

Patented June 27, 1916.
2 SHEETS—SHEET 1.

INVENTOR
Frank C. Sinback.

F. C. SINBACK.
ELECTRIC MACHINE.
APPLICATION FILED MAY 14, 1914.
1,189,180.
Patented June 27, 1916.
2 SHEETS—SHEET 2.
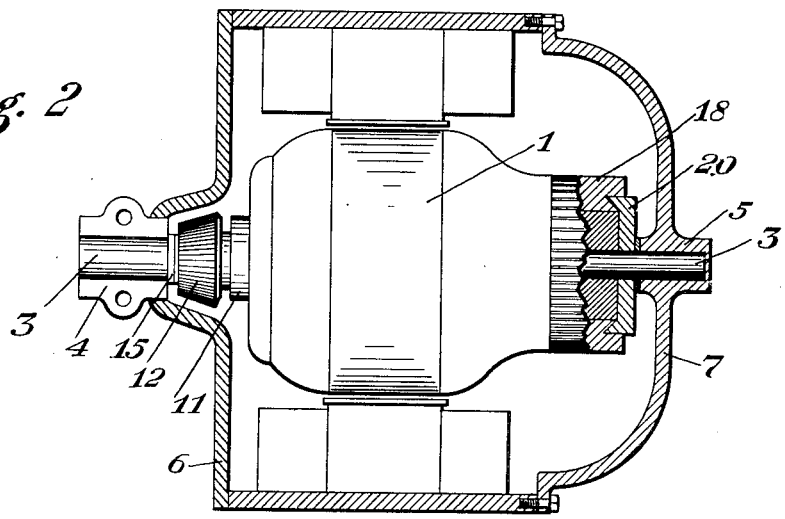
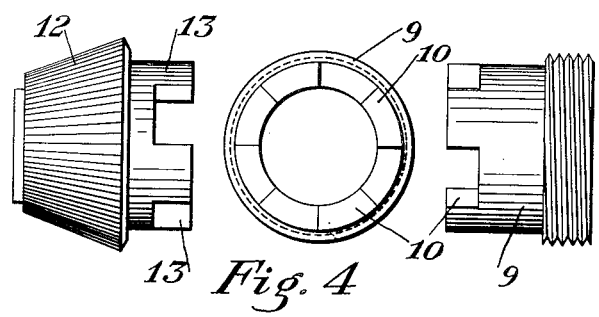
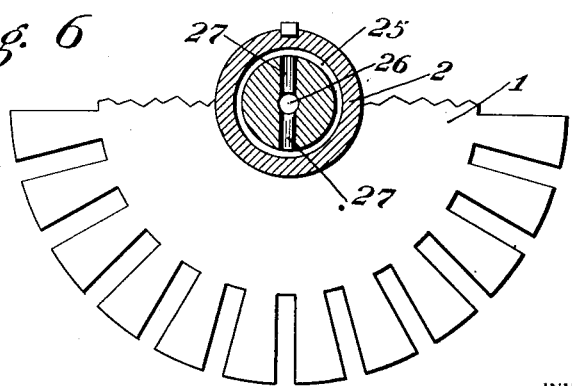
WITNESSES
INVENTOR
Frank C. Sinback.
BY
ATTORNEY

UNITED STATES PATENT OFFICE.

FRANK C. SINBACK, OF LITTLETON, ALABAMA.

ELECTRIC MACHINE.

1,189,180.  Specification of Letters Patent.  Patented June 27, 1916.

Application filed May 14, 1914. Serial No. 838,432.

*To all whom it may concern:*

Be it known that I, FRANK C. SINBACK, a citizen of the United States, residing at Littleton, in the county of Jefferson and State of Alabama, have invented certain new and useful Improvements in Electric Machines, of which the following is a specification.

My invention relates to electric machines and has for its principal objects improvements in the manner of mounting the armature, of lubricating the armature bearings, and of detachably connecting to the hub of the rotating armature the pinion or like transmission element.

My invention more particularly relates to electric motors for coal mining machines in which the size of the motor parts are necessarily limited and in which the difficulty of repair at the point of use is a matter of prime consideration in designing the machine so that the weakest parts can be readily detached and after repair, reassembled without requiring skilled labor.

One feature of my invention relates to the novel manner in which the armature is mounted to rotate upon a shaft fixed in the machine and the advantage of this construction is two-fold, namely, the wear of the bearing reduces to a minimum the displacement of the armature relatively to the field, and the shaft, being fixed, its end bearings can be reduced to a minimum, thereby shortening up the length of the machine. If it be not desired to shorten the machine the shortening up of the end bearings will permit the commutator segments to be retained in position by an end ring which can be easily removed for the repair of the segments.

Another feature of my invention resides in the manner of attaching a gear to the hub of the revolving armature.

Heretofore, to shorten the height of the machine, the pinions used have been so small that it has been impractical to form them otherwise than integral with the armature shaft and where the shaft was pressed into the armature, it is obvious that the wear or breakage of the pinion involved a serious disablement of the machine. By my invention the armature hub is provided with a clutch element which is preferably screwed therein and held by a jam nut designed to overlap the clutch jaws on a pinion when interlocked with the armature clutch. By this arrangement the sleeve effectively braces the interlocking clutch members and it is especially designed so that in backing it off it will disengage the clutch pinion.

Another feature of my invention relates to an improvement in the bearings. By the old arrangement, in order to repair the bearings the whole machine had to be sent to the shop as the bearings were carried by the motor casing. By my design the armature shaft and bearings can be readily detached from the casing and repaired at the same time, after which unskilled labor can install the same in the motor casing. In my improved bearings I utilize an integral bushing which extends under the bearing ends of the hub and under the clutch and pinion so that it takes the direct thrust strain which comes on the pinion at right angles to the shaft.

A further feature of my invention relates to the method of lubricating the armature bearings of the type as above described, which consists in inserting bushings in the ends of the hub, which bushings have their inner ends spaced to provide a lubricant space which is connected through a duct in the shaft with a force feed lubricator.

My invention further comprises the details of construction and arrangement of parts which are hereinafter more particularly described in their preferred embodiment only and claimed, reference being had to the accompanying drawings which form a part of this specification, and in which:—

Figure 1 is a longitudinal vertical sectional view through the armature core and its bearings. Fig. 2 is a sectional view showing the armature mounted in the motor casing. Fig. 3 is a side view of the clutch pinion. Figs. 4 and 5 are end and side elevations of the clutch nut. Fig. 6 is a partial sectional view on the line $x$—$x$ of Fig. 1.

Similar reference numerals refer to similar parts throughout the drawings.

The armature core 1 comprises a hub 2 mounted to rotate about a shaft 3, which at its ends is mounted in the bearings 4 and 5 carried by the main frame 6 and front wall 7 of the motor casing. The end of the shaft which fits in the bearing 4 is enlarged and held against turning by dowel pins 8. The front end of the shaft has a free sliding fit in the bearing 5 to facilitate the ready removal of the armature without disturbing the attachment of the shaft to the motor frame. The driving end of the armature hub is provided with internal threaded seats. A clutch nut 9 is screwed into the innermost seat and has jaws 10 of its clutch arranged to project slightly beyond the end of the armature hub. A lock nut 11 is screwed into the outer seat and adapted to jam and hold the clutch nut 9 securely in position, it being noted that the head of the jam nut extends beyond the clutch jaws 10. A clutch pinion 12, provided with jaws 13 (see Fig. 3) is driven into interlocked position with the jaws of the clutch nut 9 and a brass bushing 14 is inserted through the pinion and clutch nut 9 and adapted to engage a seat provided for it in the end of the armature hub. A thrust collar 15 is inserted between the outer ends of the pinion and bushing and the bearing 4. The end section 16 of the armature core is held in position by a nut 17 which is screwed on the armature hub. The commutator segments 18 are mounted on a hub 19 which is keyed on the armature and the segments are held in position thereon by a clamping ring 20 which is detachably connected by screws 21 to the hub 19. A bushing 22, similar to 14, extends from the shoulder 23 in the bore of the armature hub to the outer edge of the commutator hub, where it engages a thrust collar 24 interposed between it and the bearing 5. It will be noted that an oil space 25 is provided between the shaft 3 and the inner ends of the bushings 14 and 22, and lubricant is supplied to this space by a duct 26 drilled through the shaft to a point central between the bushings and provided there with radial outlets 27 (see Fig. 6) into the oil space. A force feed cup 28 has a pipe 29 which is passed through the bearing 4 and screwed into an opening in the lubricating duct 26 which is closed at its outer end by a screw plug 30. The force feed cup will force grease through the communicating passages into the space 25 and leave it free to flow axially of the bearing and proportionately to the requirements of the several bearings.

The clutch jaws 10 may be mechanically fastened to the driving end of the armature hub in any suitable manner, but it is preferred that they be formed on a nut which can be readily removed and replaced when required. The jaws 10 and 13 are designed to interlock with so close a fit that the clutch members have to be driven into locking position. In this connection the advantage is apparent of having the nut 11 designed so that in backing it out of the armature hub it will engage and gradually disengage the pinion 12 from the clutch nut 9, but my invention contemplates the use of any practicable retaining means to screw into the hub and hold the pinion in position. The thrust collar 24 being loose on shaft 3, it follows that the armature, commutator, pinion and the bushings can all be slipped out of the machine together by merely removing the end wall 7 and drawing the armature outwardly off the shaft 3, and when thus removed the armature carries with it practically every wearing part of the motor, so that it can be sent to the shop and fully repaired ready for reinstating by merely slipping it again on the shaft and bolting the head 7 back in position. The bushings 14 and 22 take the direct side thrust from the pinion as well as the wear of the armature and inasmuch as the wear is taken up by a rotating sleeve it does not tend to shift the armature out of true position to the fields as rapidly as where the wear is in one direction only in the bearings of a rotating shaft. The shaft being fixed I am enabled to cut down the length of the bearing for the commutator end of the armature sufficiently to avoid the use of an undercut commutator to receive the internal end of the bearing. By this change in design the shortening of the bearing makes it practical to place the clamping ring 20 to the outside so that it is only necessary to remove it to replace or repair segments and the removal of the whole commutator for this purpose, as is now generally required, is avoided.

My manner of constructing and connecting the pinion to the armature is such that I am enabled to use a pinion of no larger size than those at present cut integral with the rotating armature shaft and therefore I avoid any increase in height in the machine which would otherwise result.

Having thus described my invention, what I claim as new and desire to secure by Letters Patent, is:—

1. In an electric motor, a fixed shaft, an armature having a hub rotatably mounted on said shaft and having a threaded recess at one end concentric with the shaft, a pinion mounted on the shaft and having retaining means threaded into said hub recess, and a jam nut to lock the pinion retaining means against unscrewing from said recess.

2. In an electric motor, a fixed shaft, an armature having a hub rotatably mounted on said shaft and having a threaded recess at one end concentric with the shaft, a pinion mounted on the shaft and having retaining means threaded into said hub recess, a bushing on the shaft under said hub and pinion, a jam nut to lock the pinion retaining means against unscrewing from said recess, and a casing having end bearings for said shaft and adapted to inclose said pinion.

3. In an electric motor, a fixed shaft, a rotatable armature thereon, a clutch member at the driving end of the armature having end clutch jaws, a pinion having integral clutch jaws adapted to interlock with said clutch members, and means to brace the interlocking clutch jaws, substantially as described.

4. In an electric motor, a fixed shaft, a rotatable armature thereon, a clutch member at the driving end of the armature having end clutch jaws, a pinion having integral clutch jaws adapted to interlock with said clutch members, and means to brace the interlocking clutch jaws which includes a sleeve which fits closely about the jaws and overlaps them, substantially as described.

5. In an electric motor, a fixed shaft, a rotatable armature thereon, a clutch member at the driving end of the armature having end clutch jaws, a pinion having integral clutch jaws adapted to interlock with said clutch members, and means to brace the interlocking clutch jaws which includes an integral bushing which fits snugly in the bores of both pinion clutch member and armature, substantially as described.

6. In an electric motor, a fixed shaft, a rotatable armature thereon, a clutch member at the driving end of the armature having end clutch jaws, a pinion having integral clutch jaws adapted to interlock with said clutch members, and means to brace the interlocking clutch jaws comprising a bearing sleeve within and a reinforcing sleeve without said jaws, both sleeves extending on each side beyond the interlocked clutch jaws, substantially as described.

7. In an electric machine, a fixed shaft, a rotatable armature having its hub mounted on said shaft, a clutch nut screwed into the driving end of said hub, a clutch pinion having jaws adapted to interlock with the jaws of said clutch nut, a jam nut for the clutch which when screwed home in said hub overlaps the clutch joint between pinion and clutch nut, substantially as described.

8. In an electric machine, a fixed shaft, a rotatable armature having its hub mounted on said shaft, a clutch nut screwed into the driving end of said hub, a clutch pinion having jaws adapted to interlock with the jaws of said clutch nut, a jam nut for the clutch which when screwed home in said hub overlaps the clutch joint between pinion and clutch nut, said jam nut being disposed close enough to the pinion to engage the latter and force it out of clutching engagement with the clutch nut as the jam nut is unscrewed from said hub, substantially as described.

9. In an electric machine, a fixed shaft, an armature rotatable thereon, an armature hub having threaded nut seats in its driving end, a nut having external threads and a shoulder at one end and clutch jaws at the other end, which nut is screwed into the inner hub seat, an externally threaded jam nut which surrounds the clutch nut and is screwed into the outer seat to engage said shoulder on the clutch nut in which position its outer end overhangs the outer ends of said clutch jaws, a bushing forced into the bore of the hub and clutch nut and projecting beyond the latter, and a pinion having clutch jaws on its inner end which has the same diameter as the outer end of the clutch nut and is adapted to be driven into the jam nut and into clutched engagement with said clutch nut, said bushing extending forward to form a bearing for said pinion, substantially as described.

In testimony whereof, I affix my signature in presence of two witnesses.

FRANK C. SINBACK.

Witnesses:
R. D. JOHNSTON, Jr.,
NOMIE WELSH.